No. 695,826. Patented Mar. 18, 1902.
M. F. McCORMICK.
RAILWAY VELOCIPEDE.
(Application filed Aug. 16, 1901.)
(No Model.) 2 Sheets—Sheet 1.
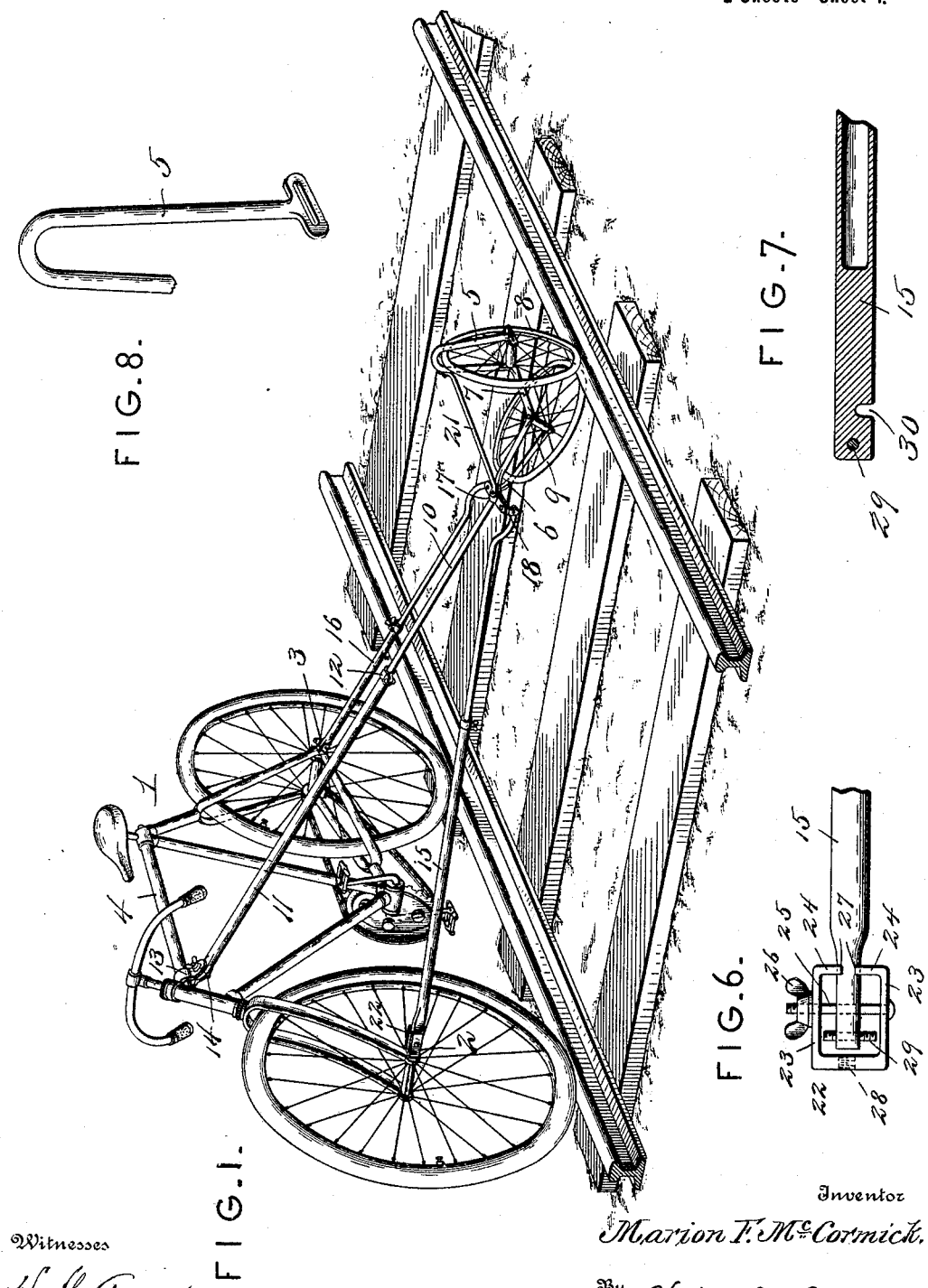
Inventor
Marion F. McCormick.
By Victor J. Evans.
Attorney
Witnesses
H. L. Amer.
H. Schmidt.

No. 695,826. Patented Mar. 18, 1902.
M. F. McCORMICK.
RAILWAY VELOCIPEDE.
(Application filed Aug. 16, 1901.)
(No Model.) 2 Sheets—Sheet 2.
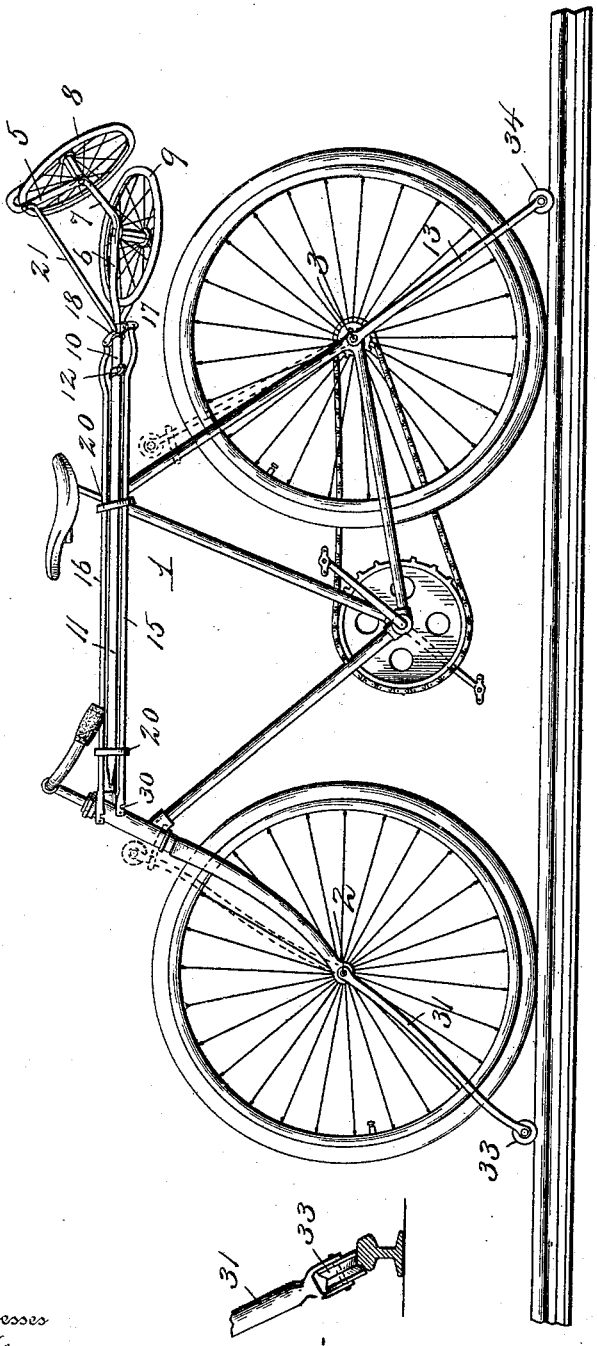
Witnesses
H. L. Ames
H. Schmidt
Inventor
Marion F. McCormick
By Victor J. Evans
Attorney

UNITED STATES PATENT OFFICE.

MARION F. McCORMICK, OF KNOX, INDIANA, ASSIGNOR OF ONE-HALF TO FRANK E. DUMAS, OF KNOX, INDIANA.

RAILWAY-VELOCIPEDE.

SPECIFICATION forming part of Letters Patent No. 695,826, dated March 18, 1902.

Application filed August 16, 1901. Serial No. 72,308. (No model.)

*To all whom it may concern:*

Be it known that I, MARION F. MCCORMICK, a citizen of the United States, residing at Knox, in the county of Starke and State of Indiana, have invented new and useful Improvements in Railway-Velocipedes, of which the following is a specification.

This invention relates to railway-velocipedes, and the object in view is to provide an attachment for ordinary safety-bicycles, whereby the same may be equipped with mechanism adapting the bicycles to be propelled along railways, one of the rails of which forms the surface over which the bicycle travels. The attachment operates to hold both wheels of the bicycle in alinement with each other and in engagement with the top of the rail, requiring no attention on the part of the rider. The attachment when not needed may be readily detached from the bicycle, folded, and strapped or otherwise mounted upon the frame of the bicycle, so that it may be conveniently carried while propelling the machine along ordinary roads.

A further object of the invention is to provide auxiliary arms carrying pilot and trailer wheels especially designed for holding the wheels of the bicycle in proper relation to the rail during a heavy side wind, which would otherwise have a tendency to derail the bicycle.

With the above and other objects in view, the nature of which will appear more fully as the description proceeds, the invention consists in the novel construction, combination, and arrangement hereinafter fully described, illustrated, and claimed.

In the accompanying drawings, Figure 1 is a perspective view showing a bicycle mounted upon a rail with the attachment applied. Fig. 2 is a side elevation of a bicycle, showing the auxiliary folding arms, which carry the pilot and trailer wheels, the said view also showing the manner of carrying the attachment when not in use. Fig. 3 is an enlarged detail perspective view of the main frame-bar, braces, cross-head, and double fork. Fig. 4 is a detail sectional view through the cross-head. Fig. 5 is a sectional view showing the manner of connecting the main frame-bar with the frame of the bicycle. Fig. 6 is a detail sectional view of one of the clamps for securing the braces to the axles of the bicycle. Fig. 7 is a detail sectional view of the inner end of one of the braces. Fig. 8 is a detail perspective view of the outer vertical fork of the attachment. Fig. 9 is a detail view of one of the folding arms and grooved wheel carried thereby, showing the wheel in engagement with the rail.

Similar numerals of reference designate corresponding parts in all the figures.

Referring to the drawings, 1 designates an ordinary safety-bicycle comprising the usual frame, the front and rear axles 2 and 3, respectively, and the top run 4, forming a part of the machine-frame.

The attachment comprises, essentially, a double fork, or, in other words, the outer vertical fork 5 and the inner inclined fork 6, which forks are joined together rigidly by means of a connecting-bar 7, as clearly shown in Figs. 1 and 3. Mounted within the outer vertical fork 5 is a supporting rubber-tired wheel 8, and mounted within the inclined fork 6 is an inclined guard-wheel 9, which is also provided with a rubber tire. The wheel 8 stands vertically and forms the main support for the attachment and the bicycle to which the attachment is applied, said wheel traveling on the rail opposite that upon which the bicycle moves. The guard-wheel 9 bears against the inner side of the head of the rail and holds the wheel 8 in proper relation to the rail, while the rubber tire on the inclined wheel prevents the supporting-wheel 8 from being accidentally displaced or thrown off the rail.

The crown of the inclined fork 6 is extended in the form of a stem, which forms the main frame-bar 10 of the attachment. Said bar is telescopic, as shown in Fig. 1, so that it may be lengthened and shortened to properly position the several wheels with respect to the rails, the outer section 10 being adapted to slide within the inner section 11 of said frame-bar, the two sections being rigidly held when adjusted by means of a suitable clamp 12. The main frame-bar 10 11 is connected at its inner upper end to the top run 4 of the bicycle by means of a clip 13, which may be either in the form of a strap or hook encircling or partially encircling the bar 4 and connected with the main frame-bar of the attachment by means of a clamping device 14, which enables the parts to be uncoupled in removing the attachment.

In addition to the main frame-bar the attachment comprises front and rear braces 15 and 16, respectively, each of which is of telescopic construction similar to but preferably smaller in size than the main frame-bar 10 11. The braces are connected at their outer ends to a cross-head 17, which is composed of a pair of oppositely-located yokes 18, the inner ends of which are overlapped upon the bar 10, as shown in Fig. 4, and pivotally connected thereto by means of a common pivot-bolt 19. This construction enables the braces to be folded toward each other into parallel relation to the main frame-bar 10 11 for the purpose of carrying the attachment upon the frame of the machine, as shown in Fig. 2, straps 20 being shown as the preferred means for securing the attachment to the frame of the bicycle, although any other means may be utilized.

21 designates a brace connecting the crowns of the two forks for giving additional strength to the attachment.

The inner end of each of the braces 15 and 16 is connected to the front or rear axle of the machine, as the case may be, by means of a clamp 22, (illustrated in detail in Fig. 6,) in which the clamp is seen to comprise a U-shaped body formed of spring material to provide oppositely-located yielding arms 23, the extremities of which are extended inward toward each other, as shown at 24, so as to engage the inner end of one of the braces. The brace is pivotally connected with the clamp by means of a bolt 25, provided with a thumb-nut 26, by means of which the brace may be securely clamped between the inbent extremities 24, the said extremities being provided with lips 27, which project toward each other over the top of the brace, so as to prevent said brace from swinging upward on its pivot and allowing the bicycle to drop over sidewise.

The clamp 22 is provided in its inner end with an opening 28 to fit over the adjacent end of the axle of the bicycle. The clamp may be secured to the axle by means of the usual nut, or the opening 28 may be screw-threaded, so that the clamp may be secured directly upon the axle after the usual nut has been removed.

The inner extremity of each of the braces 15 and 16 is provided with an adjustable screw 29, adapted to impinge against one or the other of the arms 23 of the clamp for the purpose of adjusting the angle of the front wheel of the bicycle, it being desirable to adjust said wheel so as to give the same a tendency to travel toward the inner side of the head of the rail, not sufficiently, however, to produce any binding or sliding effect which would interfere with the free running of the machine.

This tends to keep the steering-wheel in proper engagement with the rail and prevents it from slipping off the outer side thereof. Each of the braces 15 and 16 is provided with a notch 30 to receive the pivot-bolt 25, thus enabling the braces to be quickly detached from the machine without the necessity of removing such bolt.

In Fig. 2 I have illustrated the employment of auxiliary front and rear folding arms 31 and 32, respectively. These arms are mounted upon the extremities of the front and rear axles of the machine and adapted to be moved downward to the full-line position (shown in Fig. 2) or thrown upward to the dotted-line position of the same figure when not required in use. Journaled in the extremity of the front arm 31 is what I term a "pilot-wheel" 33, which is grooved, as shown in Fig. 9, to fit the side of the head of the rail. The rear arm has journaled in its end portion what I term a "trailer-wheel" 34, similar in all respects to the pilot-wheel 33, but traveling in rear of the driving-wheel of the machine, whereas the pilot-wheel 33 moves in advance of the steering-wheel.

The pilot and trailer wheels are not essential to the invention, but are adapted to be brought into use as an auxiliary part of the device for guarding against derailment of the bicycle during the existence of lateral or side winds.

From the foregoing description it will be seen that the attachment may be readily applied to any ordinary safety-bicycle, adapting the same to be propelled on a railway; further, that the attachment may be readily removed from the machine and strapped to or otherwise connected with the machine-frame, so that it may be transported while the machine is ridden on ordinary roads.

Another important feature of the invention resides in the fact that the supporting-wheel may be adjusted forward or backward with respect to the center of the bicycle for properly positioning the wheels of the bicycle and causing the latter to follow the rail. By employing the vertical and inclined supporting and guard wheels and providing the same with rubber tires friction is reduced to the minimum at that point and the supporting-wheel is prevented from jumping off the rail.

It will be understood that the invention is susceptible of various changes in the form, proportion, and minor details of construction which may accordingly be resorted to without departing from the principle or sacrificing any of the advantages of the invention.

Having thus fully described my invention, what I claim as new, and desire to secure by Letters Patent, is—

1. An attachment for adapting bicycles to be propelled along railways, comprising a main frame-bar, means for coupling said bar at one end to the frame of the bicycle, a double fork at the outer end of said frame-bar, a vertical supporting-wheel mounted in one fork, an inclined guard-wheel mounted in the other fork and adapted to roll in contact with the inner side of the head of the rail, both of said wheels being equipped with rubber tires, and braces connecting said frame-bar with the frame of the bicycle.

2. The combination with a bicycle, of an attachment adapting the same to be ridden on railways, said attachment comprising a main frame-bar, means for coupling said bar to the machine-frame, inclined and vertical forks at the outer end of said frame-bar, rubber-tired supporting and guard wheels mounted in said forks and adapted to roll in contact with one of the rails, a cross-head near the outer end of said frame-bar, and braces connected to said cross-head and having provision for their attachment to the frame of the bicycle.

3. The combination with a bicycle, of an attachment adapting the same to be propelled along a railway, the attachment comprising a main frame-bar, means for coupling said bar to the machine-frame, vertical and inclined forks at the outer end of said frame-bar, rubber-tired supporting and guard wheels journaled in said forks and adapted to roll in contact with one of the rails, a cross-head on the main frame-bar consisting of oppositely-extending yokes connected by a common pivot with the main frame-bar, and braces interposed between said yokes and the machine-frame and detachably connected with the latter.

4. The combination with a bicycle, of an attachment adapting the same to be ridden upon a railway, the attachment comprising a main frame-bar, means for coupling said bar to the machine-frame, a supporting-wheel carried by the outer end of said bar, braces extending from the outer end of said bar inward, and spring-clamps for connecting the inner ends of the braces to the machine-frame, each of said clamps comprising means for connecting the same to one of the axles of the bicycle, spring-arms with inwardly-projecting lips for engaging the braces, and a combined pivot and clamping-bolt connecting the clamp and braces.

5. The combination with a bicycle, of an attachment adapting the same to be propelled along a railway, the attachment comprising a main frame-bar, means for coupling said bar to the machine-frame, vertical and inclined rubber-tired wheels carried by the outer end of said arm and adapted to roll in contact with one of the rails, braces connecting the outer end of said arm with the machine-frame, and auxiliary folding arms connected to the front and rear axles of the bicycle and provided with grooved pilot and trailer wheels adapted to operate against the rail in advance and in rear of the machine-wheels.

6. The combination with a bicycle, of an attachment adapting the same to be propelled along a railway, the attachment comprising a main frame-bar, means for coupling said bar to the machine-frame, vertical and inclined forks at the outer end of said frame-bar, the vertical fork having its outer blade provided with a slotted horizontal extension, a supporting-wheel journaled in the outer fork with its axle adjustably mounted in said slotted extension, a guard-wheel journaled in the inclined fork, and braces interposed between the main frame-bar and the frame of the bicycle.

In testimony whereof I affix my signature in presence of two witnesses.

MARION F. McCORMICK.

Witnesses:
LYMAN M. TANNEHILL,
JOHN DAVIS.